United States Patent
Schröferl et al.

(10) Patent No.: US 11,472,072 B2
(45) Date of Patent: Oct. 18, 2022

(54) DEVICE AND METHOD FOR PROCESSING A COVER, ASSEMBLY FOR A VEHICLE ROOF, AND VEHICLE ROOF FOR A MOTOR VEHICLE

(71) Applicant: Webasto SE, Stockdorf (DE)

(72) Inventors: Thomas Schröferl, Stockdorf (DE); Bernhard Harnischfeger, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 483 days.

(21) Appl. No.: 16/463,595

(22) PCT Filed: Nov. 22, 2017

(86) PCT No.: PCT/EP2017/080099
§ 371 (c)(1),
(2) Date: May 23, 2019

(87) PCT Pub. No.: WO2018/099786
PCT Pub. Date: Jun. 7, 2018

(65) Prior Publication Data
US 2019/0275713 A1     Sep. 12, 2019

(30) Foreign Application Priority Data

Nov. 29, 2016 (DE) ..................... 10 2016 123 021.9

(51) Int. Cl.
*B29C 44/58* (2006.01)
*B29C 44/12* (2006.01)
(Continued)

(52) U.S. Cl.
CPC ........ *B29C 44/1271* (2013.01); *B29C 44/351* (2013.01); *B29C 44/58* (2013.01);
(Continued)

(58) Field of Classification Search
CPC ... B29C 44/1271; B29C 44/351; B29C 44/58; B29C 45/14377; B29C 2045/14459;
(Continued)

(56) References Cited

U.S. PATENT DOCUMENTS

| 5,665,397 A | 9/1997 | Fisher et al. |
| 8,979,183 B2 | 3/2015 | Schulz |

(Continued)

FOREIGN PATENT DOCUMENTS

| CN | 1293121 A | 5/2001 |
| CN | 104647679 A | 5/2015 |

(Continued)

OTHER PUBLICATIONS

Office Action issued against corresponding Korean Patent Application No. 10-2019-7016456 dated Jun. 15, 2020 (6 pages).

(Continued)

*Primary Examiner* — Jeffrey M Wollschlager
*Assistant Examiner* — Xue H Liu
(74) *Attorney, Agent, or Firm* — Fitch, Even, Tabin & Flannery, LLP

(57) ABSTRACT

A device for machining a cover for a motor vehicle may have a lower mold having a sealing element and a first recess and a second recess a distance from the first recess. The sealing element is arranged in part in the first recess of the lower mold so that the element extends with respect to a surface of the lower mold. The sealing element and the second recess of the lower mold are formed so as to define a cavity in a predefined manner in cooperation with a lower face of the cover. The device further may have a counter bearing which is designed, when forming the cavity on the lower face of the cover, to exert a counter force on an upper face of the cover towards the lower mold.

3 Claims, 4 Drawing Sheets

(51) Int. Cl.
    *B29C 44/34*     (2006.01)
    *B29C 45/14*     (2006.01)
    *B62D 25/06*     (2006.01)
    *B29K 105/04*     (2006.01)
    *B29L 31/30*     (2006.01)
    *B29L 31/00*     (2006.01)

(52) U.S. Cl.
    CPC ........ *B29C 45/14377* (2013.01); *B62D 25/06* (2013.01); *B29C 2045/14459* (2013.01); *B29K 2105/04* (2013.01); *B29L 2031/3005* (2013.01); *B29L 2031/7782* (2013.01)

(58) Field of Classification Search
    CPC ......... B29K 2105/04; B29L 2031/3005; B29L 2031/7782
    USPC ........................................................ 425/500
    See application file for complete search history.

(56) References Cited

U.S. PATENT DOCUMENTS

| | | |
|---|---|---|
| 2006/0237870 A1 | 10/2006 | Bordeaux et al. |
| 2007/0254139 A1 | 11/2007 | Seebass |
| 2010/0276969 A1 | 11/2010 | Auchter-Bruening |
| 2014/0049076 A1 | 2/2014 | Roeder et al. |
| 2014/0342031 A1 | 11/2014 | Sitterlet et al. |
| 2016/0297118 A1 | 10/2016 | Yu et al. |

FOREIGN PATENT DOCUMENTS

| | | |
|---|---|---|
| CN | 103568792 B | 7/2016 |
| DE | 102004056479 A1 | 5/2006 |
| DE | 102010016583 A1 | 1/2011 |
| DE | 102010051700 A1 | 5/2012 |
| DE | 102012003045 A1 | 8/2013 |
| EP | 0355209 B1 | 2/1993 |
| KR | 10200600038390 A | 10/2007 |

OTHER PUBLICATIONS

Decision of Allowance issued for corresponding Korean Patent Application No. 10-2019-7016456 dated Dec. 30, 2020 with English translation (4 pages).

Office Action issued against corresponding Chinese Patent Application No. 201780073498.6 dated Aug. 28, 2020 with English translation (22 pages).

International Search Report for PCT/EP2017/080099 dated Mar. 28, 2018 (7 Pages).

DEVICE AND METHOD FOR PROCESSING A COVER, ASSEMBLY FOR A VEHICLE ROOF, AND VEHICLE ROOF FOR A MOTOR VEHICLE

Device and method for processing a cover, assembly for a vehicle roof, and vehicle roof for a motor vehicle

CROSS-REFERENCE TO RELATED APPLICATIONS

This application is a U.S. national phase application filed under 35 U.S.C. § 371 of International Application No. PCT/EP2017/080099, filed Nov. 22, 2017, designating the United States, which claims priority from German Patent Application No. 10 2016 123 021.9, filed Nov. 29, 2016, which are hereby incorporated herein by reference in their entirety for all purposes.

FIELD

The invention relates to a device and to a method for machining a cover for a motor vehicle which can contribute to a time-saving and cost-effective construction of the vehicle roof. The invention also relates to an assembly for a vehicle roof and to a corresponding vehicle roof which can be produced in particular by means of the device and the method for machining a cover.

BACKGROUND

When producing and attaching a foam cladding to a plate or a cover for motor vehicles, the workpiece to be machined is conventionally handled by means of special molding tools. For example, by forming and filling a cavity, a foam cladding is formed on an edge of the plate. In this manner, it is possible to connect components to the plate and to prepare a fastening of the plate to a body of a motor vehicle.

A special molding tool or foam mold required for this purpose generally comprises two mold halves which are coordinated with one another as an upper part and lower part and allow foam claddings to be formed. In this case, the mold halves must be held in respective mold carriers and must be movable to allow the desired formation of foam claddings. Such a formation of a foam cladding is described for example in EP 0355209 B1.

SUMMARY

The invention addresses the problem of providing a device and a method for machining a cover for a motor vehicle which allow a time-saving and cost-effective construction of an assembly for a vehicle roof, and of a vehicle roof for the motor vehicle.

The problem is solved by the features of the independent claims. Advantageous developments are indicated in the dependent claims.

A device according to the invention for machining a cover for a motor vehicle comprises a lower mold, which has a sealing element and a first recess and a second recess which is at a distance from the first recess. The sealing element is arranged in part in the first recess of the lower mold so that said element extends with respect to a surface of the lower mold. The sealing element and the second recess of the lower mold are formed so as to define a cavity in a predefined manner in cooperation with a lower face of the cover. The device further comprises a counter bearing which is designed, when forming the cavity on the lower face of the cover, to exert a counter force on an upper face of the cover towards the lower mold so that by means of the lower mold and the counter bearing, on the lower face of the cover, foam can be formed at a distance from an edge of the cover so that the edge of the cover remains free from foam cladding.

By means of the described device, time-saving and simple machining of a cover for a motor vehicle can be achieved, which further allows a time-saving and cost-effective construction of an assembly for a vehicle roof, and of a vehicle roof for the motor vehicle.

The device provides a mold for machining a cover or another panel-shaped workpiece for a motor vehicle which allows a foam to be formed on the cover without including the edge of the cover in a foaming process. The device forms a simple mold concept for a foam mold which does not require a complicated shaping upper mold, but rather only a counter bearing to form a system and a counter force when machining the cover. By means of the lower mold, the device makes it possible to form the foam in one or more predefined positions on the lower face of the cover at a distance from the edge so that said edge remains free from foam cladding.

As a result of the fact that the cover is foamed, and the edge is formed so as to be free from foam cladding, labor-intensive secondary machining of an edge foam cladding is omitted, and time-saving and cost-reducing machining of the cover and a cost-effective construction of a corresponding vehicle roof are facilitated. In the case of a conventional foaming of a cover with an edge foam cladding, a separation burr is generally formed which is caused by a gap between two cooperating mold halves. In the context of an injection molding process, the foam material penetrates this gap in an undesired manner so that after setting of the foam material, a type of pelt remains, which protrudes from the provided edge foam cladding and hangs down in the manner of a pelt. For a desired surface texture and an attractive end result, it is necessary to remove such a pelt or such a separation burr by means of labor-intensive mechanical secondary machining.

The foam which can be formed by means of the described device can be formed on the lower face of the cover in such a way that an outer edge of the foam ends on the lower face of the cover, and the edge of the cover remains free from foam cladding. There is thus a gap between the edge of the cover and the foam on the lower face of the cover. As a result of such a gap, the sealing element of the lower mold can advantageously be used to seal the cavity between the cover and the lower mold and to define said cavity in a predefined manner to allow the cavity to be filled in a reliable manner and the foam to be formed with an attractive end result. The foam formed does not require labor-intensive secondary machining, as part of which some of the foam would be removed.

The cover represents a panel-shaped workpiece which can preferably be machined by means of the device and which has an essential main extension plane which is clearly greater than a thickness of the cover. For example, the cover has a thickness of a few millimeters to a few centimeters, whereas a length and a width of the cover extend over several tens of centimeters. The lower face, the upper face and the edge of the cover and additional directional information such as top, bottom, front and rear relate, in the context of the invention, to position and location information with respect to an operational state of a motor vehicle which comprises a vehicle roof having such a cover. The upper face of the cover is therefore formed opposite the lower face of the cover and, when installed, facing away from the vehicle interior. The edge laterally surrounds or defines the cover and connects the upper face of the cover to the lower face.

According to one development of the device, the sealing element of the lower mold is in the form of a shadow joint seal. A shadow joint seal allows particularly reliable and clean foaming of the cover lower face. The shadow joint seal extends out of the first recess of the lower mold and kinks or bends off in a predefined manner when the cover is in contact therewith. To form the foam, the cooperating components are positioned relative to one another in such a way that the cover is clamped between the lower mold and the counter bearing, and the cavity is formed and sealed in a controlled manner on the lower face of the cover by means of the second recess and the shadow joint seal.

According to one development of the device, the lower mold has an additional sealing element and an additional, third recess which is formed with respect to the first recess on an opposite side to the second recess at a distance from the second recess. The additional sealing element is arranged in part in the third recess of the lower mold so that said element extends with respect to a surface of the lower mold. The additional sealing element and the second recess of the lower mold are formed so as to define a cavity in a predefined manner in cooperation with a lower face of the cover. Another sealing element of the lower mold can preferably contribute to forming the foam in a reliable and neat manner.

According to one development of the device, the additional sealing element of the lower mold is in the form of a string gasket. The string gasket is in particular formed opposite the shadow joint seal or the sealing element on another side of the shaping second recess of the lower mold. For example, the lower mold is in the form of a self-contained frame, and therefore the shadow joint seal forms an outer sealing ring, and the string gasket forms an inner sealing ring with respect to a center of the cover. A shaped foam then forms an inner foam frame which is arranged at a distance from the foam-cladding-free edge of the cover on the lower face of the cover.

A method according to the invention for machining a cover for a motor vehicle comprises providing the cover and positioning the cover relative to a lower mold. The lower mold is designed to machine the cover and has a first recess, in which a sealing element is arranged in part, and a second recess. The method further comprises bringing the lower mold into contact with the cover and thereby forming a cavity on a lower face of the cover by means of the sealing element and the second recess of the lower mold. In addition, the method comprises introducing a predefined material into the cavity and thereby forming a foam on the lower face of the cover so that the foam is arranged at a distance from an edge of the cover, and the edge of the cover is formed so as to be free from foam cladding.

By means of the described method, it is possible to machine a cover in a time-saving and simple manner, which machining allows a cost-effective construction of an assembly for a vehicle roof and of a vehicle roof for the motor vehicle. Such a method can be carried out in particular by means of one embodiment of the previously described device, and therefore all the properties and features of the previously described device are also disclosed for the method and vice versa.

According to one development of the method, bringing the lower mold into contact with the cover and forming the cavity on the lower face of the cover comprises forming the cavity on the lower face of the cover by means of the sealing element, the second recess and another sealing element of the lower mold. When bringing the cover into contact with the lower mold, for example one of the sealing elements is kinked off in a controlled manner so that, together with the opposing additional sealing element and the interposed second recess, said element defines the cavity for the foam to be shaped in a predefined manner.

According to one development of the method, forming the foam on the lower face of the cover comprises arranging a functional element on the lower face of the cover. A functional element of this type can have a reinforcing plate to increase the rigidity of the cover and/or can form an interface for fastening the cover to a body of the motor vehicle. Alternatively or additionally, the functional element can have a screen to coat the foam and/or additional elements and cover them in a predefined manner. Alternatively or additionally, the functional element can form inter alia a guiding rail to allow controlled guidance of the cover or a shading device.

An assembly according to the invention for a vehicle roof comprises a cover, which is designed to close a roof opening in the vehicle roof and which has an upper face, a lower face and a peripheral edge. The assembly further comprises a foam which is arranged at a distance from the edge on the lower face of the cover so that the edge of the cover is formed so as to be free from foam cladding. Such an assembly can be produced in particular by means of one of the previously described methods or by means of one of the previously described devices so that, if applicable, properties and features of the device and of the method are also disclosed for the assembly and vice versa.

A vehicle roof according to the invention for a motor vehicle comprises at least one embodiment of the previously described assembly, which is designed to close the roof opening in the vehicle roof of the motor vehicle by means of the cover. The cover can in particular also be designed to be displaceable relative to the vehicle roof to selectively allow the roof opening to be opened and closed. Since the vehicle roof comprises an embodiment of the previously described assembly, all the properties and features of the assembly or relevant properties and features of the device and of the method for machining the cover are also disclosed for the vehicle roof and vice versa.

Exemplary embodiments of the invention will be described in greater detail below with reference to the schematic drawings, in which:

BRIEF DESCRIPTIONS OF THE DRAWINGS

DETAILED DESCRIPTION

Elements having the same design or function are labeled with the same reference signs in all the drawings.

Figure 1:
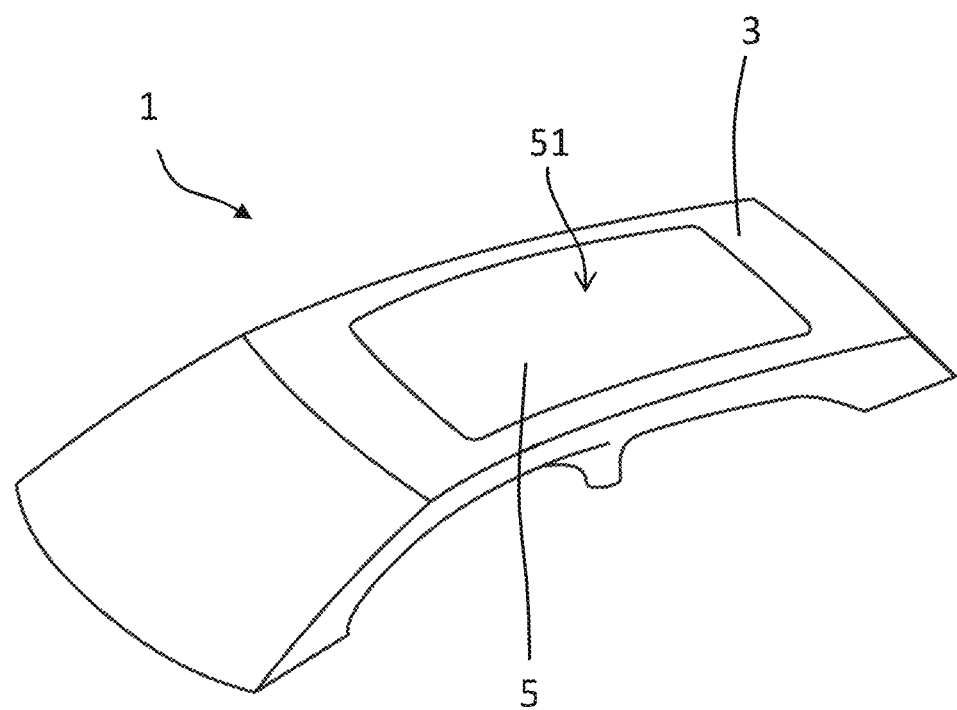
FIG. 1 is a perspective view of a vehicle roof of a motor vehicle.
Figure 1:
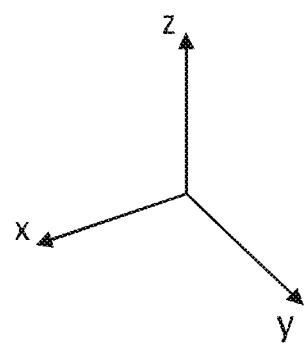

FIG. 1 is a schematic perspective view of a motor vehicle 1, comprising a vehicle roof 3, which has a cover 5 having an upper face 51, a lower face 52 and a peripheral edge 53. The cover 5 forms for example a fixed glass element which is stationary relative to the vehicle roof 3. Alternatively, the cover 5 is designed to be movable relative to the vehicle roof 3 to selectively open and close a roof opening in the vehicle roof 3.

As explained with reference to the following drawings, FIGS. 2 to 4B, the cover 5 forms an assembly for the vehicle roof 3 which can be formed in a time-saving and cost-effective manner by means of a specific molding tool.

Figure 2:
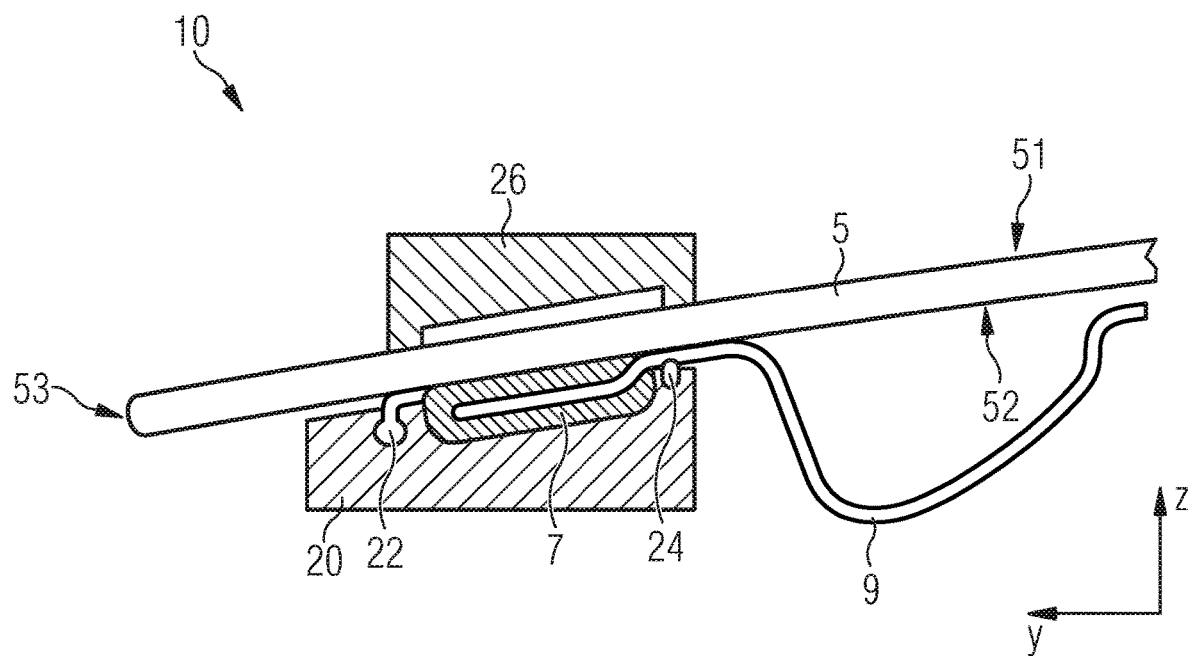
FIG. 2 shows an exemplary embodiment of a device for machining a cover for a motor vehicle.

In one schematic, sectional view, FIG. 2 illustrates a step of a production method for machining the cover 5 and for forming an assembly for the vehicle roof. By means of a device 10, a simple and cost-effective design of the vehicle roof 3 can be implemented.

The device 10 forms the molding tool for machining the cover 5 and comprises a lower mold 20, which has a sealing element 22 and a first recess and a second recess which is at a distance from the first recess. The sealing element 22 is arranged in part in the first recess of the lower mold 20 so that said element extends with respect to a surface of the lower mold 20. The sealing element 22 and the second recess of the lower mold 20 are designed to form and define in a predefined manner a cavity in cooperation with the lower face 52 of the cover 5.

The device 10 additionally comprises a counter bearing 26 which is designed, when forming the cavity on the lower face 52 of the cover 5, to exert a counter force on the upper face 51 of the cover 5 towards the lower mold 20 so that by means of the lower mold 20 and the counter bearing 26, on the lower face 52 of the cover 5, foam 7 can be formed at a distance from the edge 53 of the cover 5 so that the edge 53 of the cover 5 remains free from foam cladding.

When machining the cover 5 to attach the foam 7, the edge 53 of the cover 5 is not included in a foaming process. Corresponding secondary machining of a foamed cover edge is omitted. The device 10 forms a clear mold concept without requiring a complex shaping upper mold. The counter bearing 26 forms a simple component of the device 10 in order, when machining the cover 5, to form a system having one or more contact points on the upper face 52 of the cover 5 and provide a counter force against the cover 5 and the lower mold 20 being pressed on. In this simple manner, by means of the lower mold 20, the foam 7 can be formed in one or more predefined positions on the lower face 52 of the cover 5 at a distance from the edge 53 so that said edge remains free from foam cladding.

As a result of the fact that the edge 53 of the cover 5 is formed so as to be free from foam cladding, labor-intensive secondary machining of such an edge foam cladding and the removal of protruding surface structures are omitted, and time-saving and cost-reducing machining of the cover 5 and a cost-effective construction of the vehicle roof 3 are facilitated.

The foam 7 which can be formed by means of the device 10 can be formed on the lower face 52 of the cover 5 in such a way that an outer edge of the foam 7 ends on the lower face 52 of the cover 5. The region of the cover lower face 52 between the edge 53 and the foam 7 to be formed can advantageously be used to insert the sealing element 22 of the lower mold 20 in a targeted manner to form and seal the cavity between the cover 5 and the lower mold 20 to allow the cavity to be filled in a reliable manner and the foam 7 to be formed with an attractive end result. The foam 7 formed does not require labor-intensive secondary machining, as part of which for example some of the foam 7 would be removed.

In the exemplary embodiment illustrated, the foam 7 couples a functional element 9 to the lower face 52 of the cover 5. A functional element 9 of this type can be in the form of a reinforcing plate, an interface for fastening the cover 5 to a body of the motor vehicle 1 and/or in the form of a screen for coating and covering. Alternatively or additionally, the functional element 9 can form a guiding rail to allow controlled guidance of the cover 5 and/or a shading element of a shading device.

Figure 3:
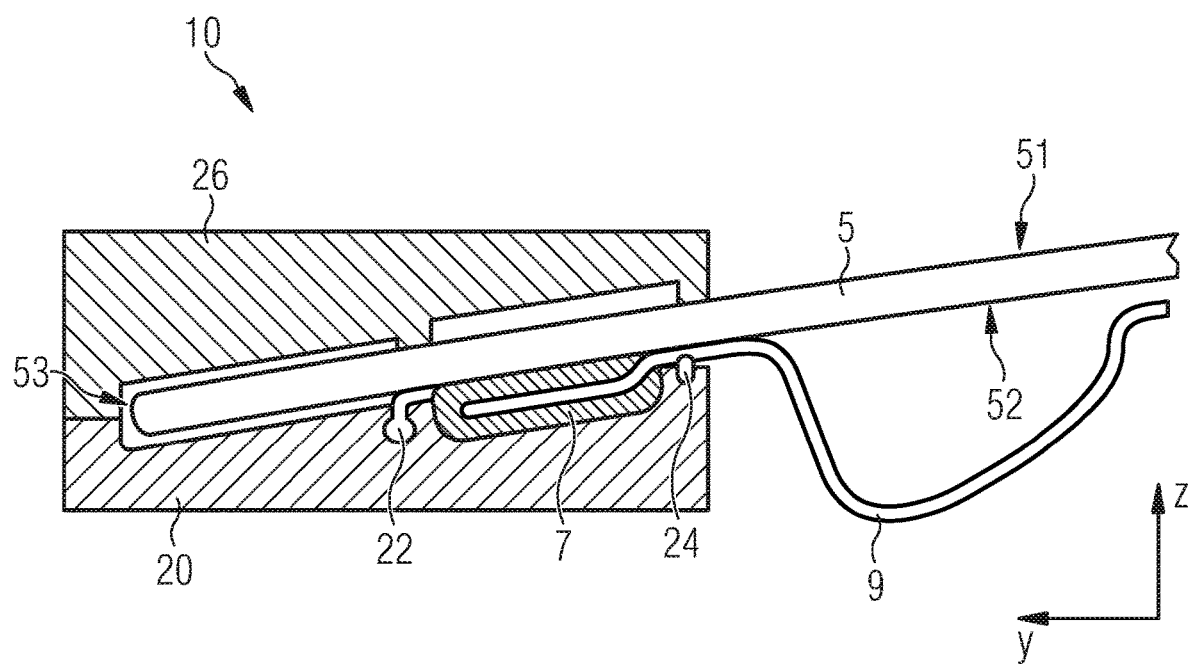
FIG. 3 shows another exemplary embodiment of the device for machining a cover for a motor vehicle.
Figure 4A:
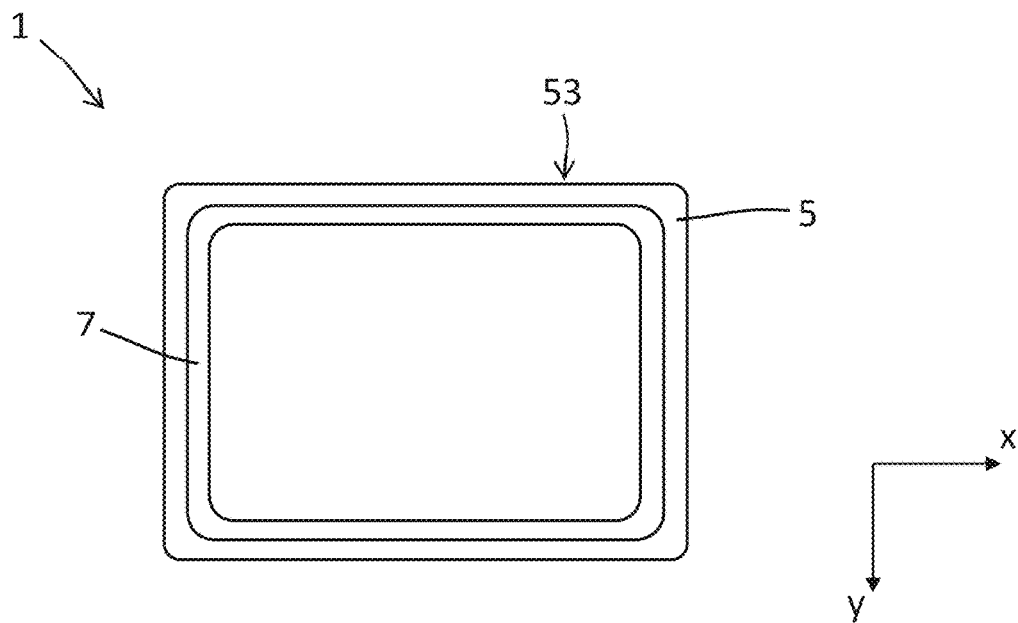
FIG. 4A-4B show different exemplary embodiments of an assembly for a vehicle roof.
Figure 4B:
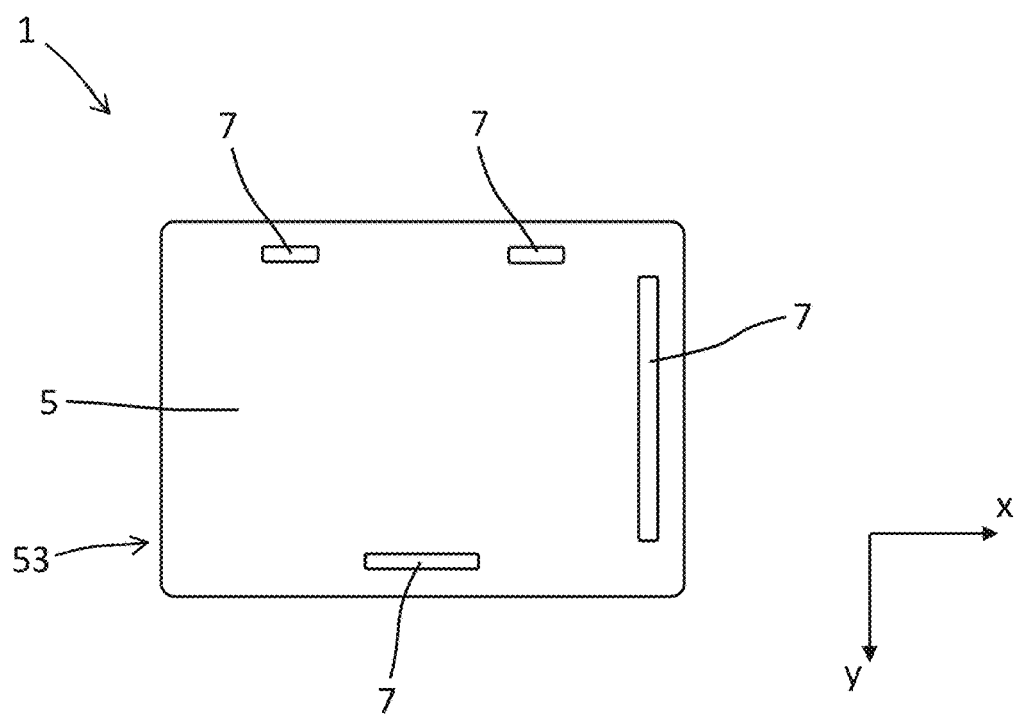

FIG. 3 shows another exemplary embodiment of the device 10 for machining the cover 5, in which it is illustrated that the counter bearing 26 and the lower mold 20 extend as far as the edge 53 of the cover 5. Depending on the application, the counter bearing 26 and the lower mold 20 can be designed in such a way that they come into contact as part of the machining of the cover 5. In this manner, a stable and reliable foaming process can be facilitated.

The cover 5 extends as a panel-shaped workpiece within an essential main extension plane which is oriented in the x-y plane with respect to the coordinate system which is marked. By comparison therewith, a thickness of the cover 5 is designed to be much smaller. The lower face 52, the upper face 51 and the edge 53 of the cover as well as similar terminology such as top, bottom, front and rear, in the context of this description, relate to conventional position and directional information with respect to an operational state of the motor vehicle 1, which has the machined cover 5 in the vehicle roof 3. The upper face 51 of the cover 5 is formed opposite the lower face 52 of the cover 5 and, in the state illustrated in FIG. 1, facing away from the vehicle interior. The edge 53 surrounds or defines the cover 5 laterally and within the roof opening, facing the vehicle roof 3.

The sealing element 22 of the lower mold 20 is preferably in the form of a shadow joint seal which allows the foam 7 to be formed on the cover lower face 52 in a particularly reliable and neat manner. In a non-contacting state, the shadow joint seal or the sealing element 22 extends upwards out of the first recess of the lower mold 20. When the cover lower face 52 and the lower mold 20 are abutting or in contact, the sealing element 22 kinks or bends off in a predefined manner and defines the cavity on an outer region with respect to a center of the cover.

The device 10 or the lower mold 20 further has an additional sealing element 24 which, with respect to the shaping second recess, is arranged opposite the sealing element 22 in an additional third recess of the lower mold 20. The additional sealing element 24 is for example in the form of a string gasket and forms an inner sealing boundary for the cavity. By means of the device 10, a time-saving and simple attachment of the foam 7 and machining of the cover 5 for the motor vehicle 1 can be achieved, which further contribute to a time-saving and cost-effective construction of an assembly for the vehicle roof 3 and of the vehicle roof 3 for the motor vehicle 1.

For example, the lower mold 20 is in the form of a self-contained frame, and therefore the outer sealing element 22 forms an outer sealing ring, and the inner sealing element 24 forms an inner sealing ring with respect to a center of the cover. In this manner, a self-contained foam 7 can be shaped, which forms an inner foam frame on the lower face 52 of the cover 5 at a distance from the foam-cladding-free edge 53 of the cover 5 (see FIG. 4A). Alternatively or additionally, the foam 7 can comprise a plurality of foam elements which are separate from one another, which are formed on the lower face 52 of the cover 5 so that said cover remains free from foam cladding (see FIG. 4B).

LIST OF REFERENCE NUMERALS 1 motor vehicle
3 vehicle roof 5 cover
51 upper face of the cover
52 lower face of the cover
53 edge of the cover
7 foam
9 functional element
10 device
20 lower mold
22 sealing element of the lower mold
24 additional sealing element of the lower mold
26 counter bearing

The invention claimed is:

1. A device for machining a cover for a motor vehicle, comprising:
 a lower mold having a sealing element and a first recess and a second recess which is at a distance from the first recess, wherein the sealing element is arranged in part in the first recess of the lower mold and extends with respect to a surface of the lower mold, and wherein the sealing element and the second recess of the lower mold are formed so as to define a cavity in a predefined manner in cooperation with a lower face of the cover, and
 a counter bearing which is designed, when forming the cavity on the lower face of the cover, to exert a counter force on an upper face of the cover towards the lower mold so that by means of the lower mold and the counter bearing, on the lower face of the cover, foam can be formed at a distance from an edge of the cover so that the edge of the cover remains free from foam cladding,
 wherein the sealing element is in the form of a shadow joint seal, which extends out of the first recess of the lower mold and kinks or bends off in a predefined manner when the cover is in contact therewith.

2. The device according to claim 1, wherein the lower mold has an additional sealing element and an additional, third recess which is formed, with respect to the first recess, on an opposite side to the second recess at a distance from the second recess, wherein the additional sealing element is arranged in part in the third recess of the lower mold and extends with respect to a surface of the lower mold, and wherein the additional sealing element and the second recess of the lower mold are formed so as to define a cavity in a predefined manner in cooperation with the lower face of the cover.

3. The device according to claim 2, wherein the additional sealing element is in the form of a string gasket.

* * * * *